(12) United States Patent
Carmichael

(10) Patent No.: X9529
(45) Date of Patent: Mar. 23, 1836

(54) STOVES

(76) Inventor: William M. Carmichael

United States Patent Patent No.: X9529

William M. Carmichael of Hempstead N. Y.
Letters Patent. Dated March 23. 1836.

The Schedule referred to in these Letters Patent and making part of the same
ontaining a description in the words of the said Wm M. Carmichael himself, of his
mprovement in the Sibylline Stove for the management of heat.

Be it Known that I, William M. Carmichael, of Hempstead, Queens
y. State of New York, have invented a new and useful improvement in the management
f heat, called "Carmichael's Sibylline Stove," which is described as follows, reference being had to
he annexed drawings of the same, making part of this Specification.

This stove consists of a cylinder which contains a chamber of com-
bustion surrounded on the inside by clay or fire brick; at the bottom of which is a grate
and below this an ash register and pan to receive the ashes and above it an opening to admit
he fuel, covered with an isinglass door: also a tube for the passage of the smoke & heat into a
drum hereinafter mentioned. This cylinder is surrounded by another cylinder of greater diameter so as
 leave a space between them for the circulation of air to be heated — the air being admitted
hrough apertures in the bottom of the outer cylinder and escaping into the room thro' other aper-
tures at top. A base or drum open in the centre supports these cylinders. Upon this base
nd around the outer cylinder are placed a number of hollow columns of the corinthian or
ther order. These columns support another drum having apertures for the smoke tube and col-
umns — Also an aperture by which the drum is cleaned. In one of the columns is a smoke
pipe for conducting the smoke into the chimney & a damper or regulator for changing its direction.
The shaft of each column is made in two parts one sliding within the other in such a manner
hat the whole may be taken apart in order to clean them, or to obtain ready access to the
nterior of the stove. The base or lower drum is supported on stands leaving a space underneath
 the passage of cold air to the cylinder. The stove may be enriched with ornaments in any style
hought proper.

A represents the inner cylinder.
B Chamber of combustion.
C clay or fire brick lining the same.
D grate E register.
F ash pan.
G isinglass door.
H tube to allow the heat & smoke to pass into the upper drum.
I outer cylinder.
K space between the cylinders for air to be heated.
L apertures at bottom to admit the air.
M apertures for its escape into the room when heated.
N the lower drum.
O columns.
P upper drum supported by the columns.
Q openings in the upper & lower drums for cleaning them.
R smoke pipe in one of the columns.
S damper or regulator in the same column.

Operation.

The fuel being introduced into the chamber of combustion and ignited and the regulator turned to produce draft the heat and smoke pass thro' the tube H into the drum P from thence into the column containing the regulator S and thence through the smoke pipe R into the chimney.

When the fuel is completely ignited & the chambers filled with warm air the regulator is turned which closes this column at top and forces the smoke & heat to pass through all the columns except the one containing the regulator into the base or lower drum N and then up through the column containing the regulator & smoke pipe which leads into the chimney. The cold air passes thro' the apertures in the bottom of the outer cylinder between it and the inner cylinder where it is heated; it then passes into the room thro' the apertures at the top. When a direct or radiating heat is preferred the outer cylinder may be dispensed with and the lower drum made whole without the opening in the centre.

The invention claimed and desired to be secured by Letters Patent consists in the arrangement and adaptation of the secreal parts of the stove producing the end before described.

Witnesses.
Wm P. Elliot
Sam. Stellinius

Wm M. Carmichael.

[illegible] Record anew June 1st 1850 –